United States Patent
Abadia et al.

(10) Patent No.: US 6,692,278 B2
(45) Date of Patent: Feb. 17, 2004

(54) MULTICONTACT ELECTRICAL CONNECTOR AND ROTATING ELECTRICAL MACHINE BEARING SAME

(75) Inventors: Roger Abadia, Neuilly-Plaisance (FR); Serge Masriera, Lyons (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/221,663

(22) PCT Filed: Jan. 16, 2002

(86) PCT No.: PCT/FR02/00158
§ 371 (c)(1), (2), (4) Date: Sep. 16, 2002

(87) PCT Pub. No.: WO02/060038
PCT Pub. Date: Aug. 1, 2002

(65) Prior Publication Data
US 2003/0109149 A1 Jun. 12, 2003

(30) Foreign Application Priority Data
Jan. 24, 2001 (FR) .............................................. 01 00931

(51) Int. Cl.[7] .............................................. H01R 13/28
(52) U.S. Cl. ...................... 439/287; 439/289; 439/364; 439/731; 439/685
(58) Field of Search ................................. 439/521, 317, 439/559, 685, 689, 690, 718, 287, 289, 737, 364, 466

(56) References Cited

U.S. PATENT DOCUMENTS

| | | | | | |
|---|---|---|---|---|---|
| 359,982 | A | * | 3/1887 | Plume | 439/286 |
| 5,145,417 | A | * | 9/1992 | Honkomp et al. | 439/685 |
| 5,199,898 | A | * | 4/1993 | Wisner | 439/367 |
| 5,338,898 | A | * | 8/1994 | Luciano et al. | 174/138 F |
| 5,503,642 | A | * | 4/1996 | Lippert et al. | 29/623.1 |
| 5,759,055 | A | * | 6/1998 | Colantuano et al. | 439/287 |

FOREIGN PATENT DOCUMENTS

FR 2 754 650 A 4/1998

* cited by examiner

Primary Examiner—Tho D. Ta
Assistant Examiner—X. Chung-Trans
(74) Attorney, Agent, or Firm—Liniak, Berenato & White

(57) ABSTRACT

Connector for forming an electrical connection between, on the one hand, a first subassembly (15) comprising at least two first electrically conducting elements and, on the other hand, a second subassembly (16) comprising at least two second electrically conducting elements, in which assembling means (60) act between the pressure area and the reaction area so as to clamp between them first and second bearing surfaces and in which the first subassembly (15) includes a casing (18) for positioning and flexible mounting of the first elements; the said casing carrying the pressure area and, opposite the pressure area, including an orifice (71) for allowing movement of the first bearing surfaces.

18 Claims, 6 Drawing Sheets

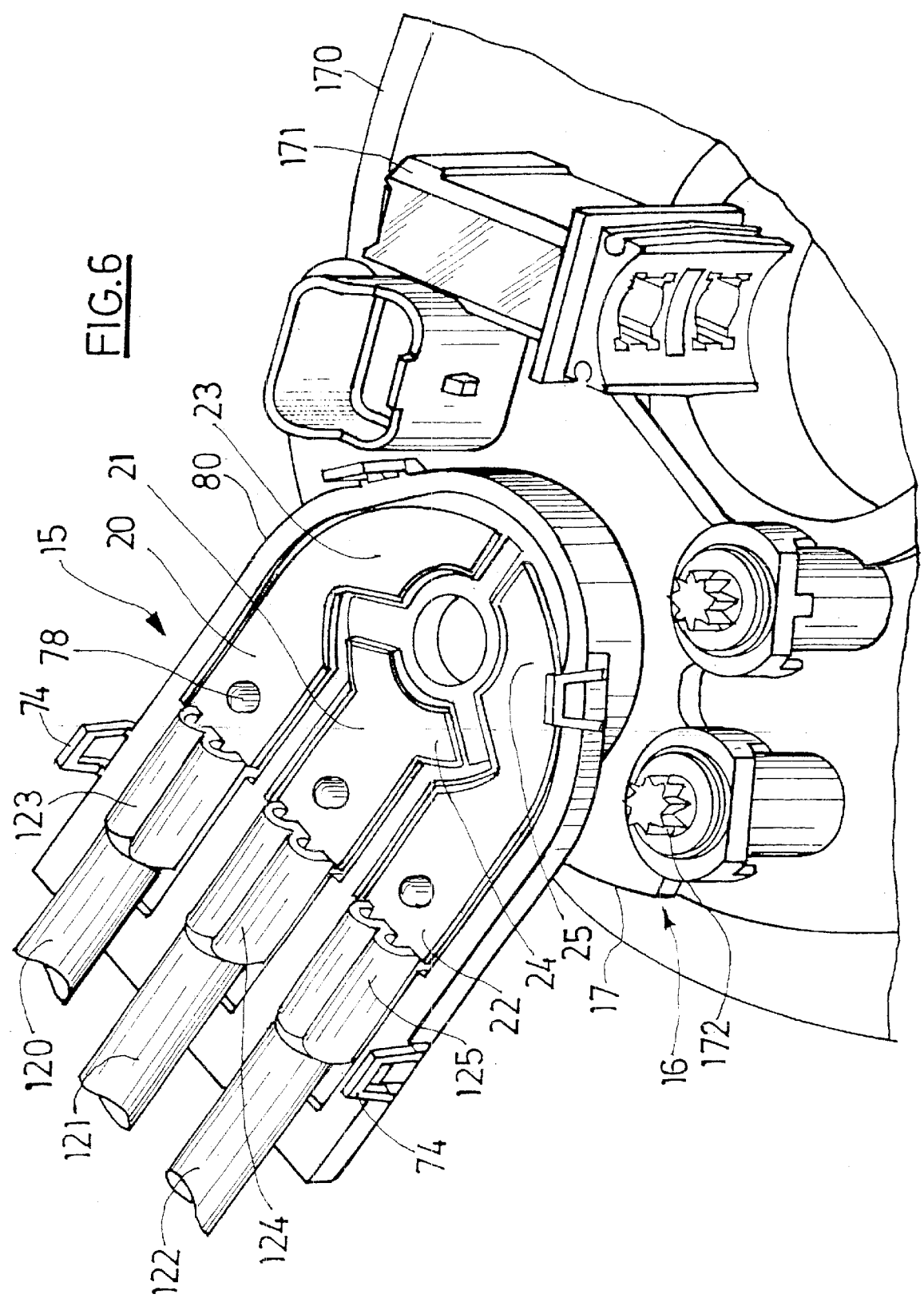

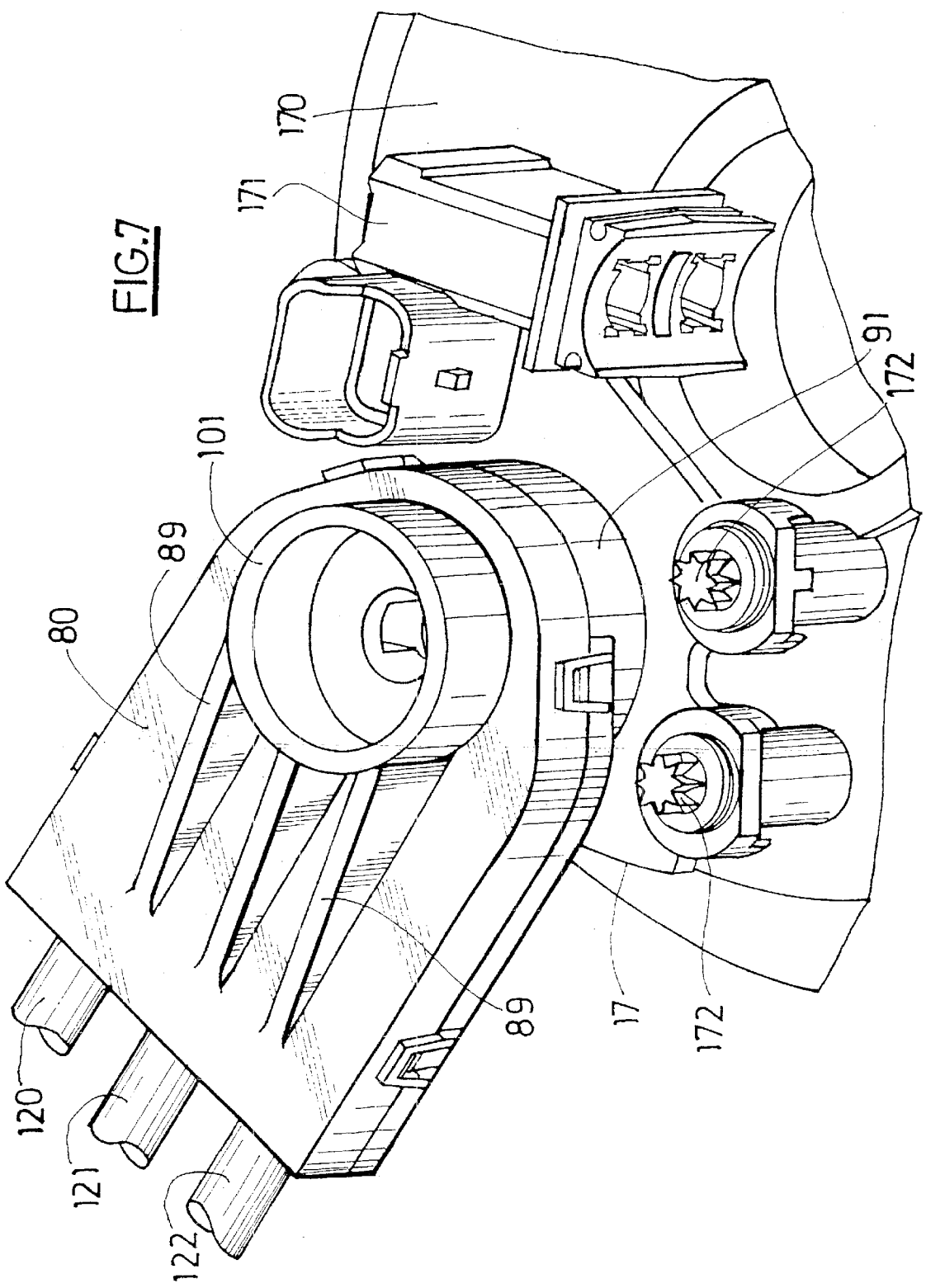

MULTICONTACT ELECTRICAL CONNECTOR AND ROTATING ELECTRICAL MACHINE BEARING SAME

FIELD OF THE INVENTION

The invention relates to an electrical connector with multiple contacts and a rotating electrical machine bearing such a connector.

The invention relates more particularly to a connector for forming an electrical connection between two subassemblies, the said connector belonging to a connecting device including electrical cables linking together the two connectors each associated with the subassemblies. Such a connector is described in the document FR-A-2 754 650.

Certain devices such as electric motors or electrical generators, for example alternators or alternators/starters, have to be linked electrically to a second device such as a control system mounted in a box called electronics box. Each phase of one of the devices has to be linked to the corresponding phase of the other device. This link can be achieved by direct contact between the corresponding phases of the two devices but, in the general way, it is formed by cables comprising several electrical wires each of which makes it possible to link one phase.

It is thus necessary to form an electrical connection between the end of each wire and the corresponding phase of the device.

STATE OF THE ART

One solution consists in placing one end of a wire in contact with the corresponding conducting area of the device and in holding them in contact by a nut-and-bolt fixing. This solution exhibits several drawbacks.

On one hand, it is necessary to form as many fixings as there are electrical connections to be formed, which entails a substantial cost given that the number of pieces, as well as the fitting times are multiplied by the number of connections to be formed. Moreover, the contacts are formed by simple pressure between the conducting regions of the device and of the cable and they are then subjected to vibration as well as to external conditions which increases the risk of corrosion and of deterioration of the electrical contact.

The French patent No 96.12609, published under number FR-A-2 754 650 (U.S. Pat. No. 5,924,897) proposes an electrical connection which makes it possible, at a single fixing point, to provide a plurality of electrical contacts between two electrical devices. The electrical connection proposed also ensures sufficient leaktightness to protect the electrical contacts against corrosion.

The electrical connecting element is composed of two parts, male and female, each including at least two conducting elements each corresponding to one electrical phase. These two parts are brought into contact by a single means, such as a nut-and-bolt fixing, which makes it possible to clamp the male part against the female part.

Care may be taken to provide elastically deformable means in order to ensure a good contact between the electrically conducting elements and a good distribution of the pressures as described in the document FR 0010737 published on Mar. 3, 2001 (after the date of priority of the present application) under the number FRA-2 799 053.

This solution gives satisfaction but leads to additional elastically deformable means being provided within the first subassembly, as well as first conducting elements in the shape of studs, guided and movable in translation.

OBJECT OF THE INVENTION

The object of the present invention is to simplify the first subassembly of the connector while having a connector of great reliability.

According to the invention, a connector for forming an electrical connection between, on the one hand, a first subassembly comprising at least two first electrically conducting elements each comprising a first bearing surface and, on the other hand, a second subassembly comprising at least two second electrically conducting elements each comprising a second bearing surface, in which the first bearing surfaces are intended to come into electrical contact with the second bearing surfaces via one of their face [sic] and into abutment with a pressure area belonging to the first subassembly via their other face, while the other face of the second bearing surfaces is intended to come into abutment with a reaction area belonging to a support which the second subassembly includes for fixing the second elements, and in which assembling means act between the pressure area and the reaction area so as to clamp between them the first and the second bearing surfaces and to exert a contact pressure on the said bearing surfaces, is characterised in that the first subassembly includes a casing for positioning and flexible mounting of the first electrically conducting elements, and in that the casing, on the one hand, carries the pressure area and, on the other hand, opposite the pressure area, includes an orifice for allowing movement of the first bearing surfaces.

According to the invention, a rotating electric machine including a rear bearing is characterised in that the second subassembly of the connector is carried by the rear bearing.

By virtue of the invention, especially of the flexible fitting of the first electrically conducting elements, it is possible to dispense with the additional elastically deformable means of the first subassembly while having reliable contacts between the first and second corresponding conducting elements, a reduced number of pieces and a simple casing.

The defects in flatness can be taken up, at least in large measure, such that the contact area between the corresponding electrically conducting elements is large and that the risks of overheating of the connector are reduced.

The link between the cables and the first conducting elements is simple.

In one embodiment, the casing is characterised in that it is delimited, on one hand, by a box for positioning of the first elements and, on the other hand, by a pressure cover comprising the pressure area, and in that the box, opposite the pressure area, includes an orifice for allowing movement of the first bearing surfaces.

In another embodiment, the pressure area is affixed onto the casing complete with the orifice in order to allow movement of the first bearing surfaces.

The pressure area is, for example, attached leaktightly by clipping, bonding, ultrasonic welding, mirror welding, laser welding, etc, onto the casing. The casing is advantageously obtained by the technique of overmoulding on the first electrically conducting elements, which are thus positioned. Needless to say, the first bearing surfaces are open to view in the region of the orifice of the casing in order to be able to deflect.

The first electrically conducting elements extend perpendicularly to the axis of assembling and, in one embodiment, are in the form of metal strips, especially in the form of tabs, shaped at the rear to form terminations for connection to the electrical cables in such a way that the solution is simple, economical and reliable.

In one embodiment, three first and second electrically conducting elements are provided.

This arrangement makes it possible to form large-area contacts allowing a high-strength current to pass while having a good distribution of the pressures.

Advantageously, the box and pressure cover are partitioned so as to separate and electrically isolate the first conducting elements.

The box includes positioning means, such as projections, for the first conducting elements.

This box serves as a receptacle for these first conducting elements before it is closed by the pressure cover in such a way that it is advantageously less rigid than the cover and is made of a material which is more economical than it.

The box is advantageously ribbed in order to increase its strength, and the same goes for the cover, which advantageously features means for preventing the first conducting elements rising up. Thus the bending of the first electrically conducting elements is controlled.

Advantageously, for reducing the bulk, means of rotational blocking of the first subassembly are installed thanks to spaces circumferentially separating the first and second contact surfaces. These means include separating partitions arising from the reaction area. These partitions thus have a double function of stiffening of the reaction area and of electrical insulation of the second bearing surfaces.

BRIEF DESCRIPTION OF THE DRAWINGS

Other characteristics and advantages will emerge, upon reading the description, for an understanding of which reference will be made to the attached drawings, among which:

FIG. 6 is a view in perspective of the connector mounted on the rear bearing of the rotating electric machine without its pressure cover;

FIG. 7 is a view in perspective of the connector from another angle so as to show the ribs of the pressure cover.

DESCRIPTION OF PREFERRED EMBODIMENTS OF THE INVENTION

Figure 1:
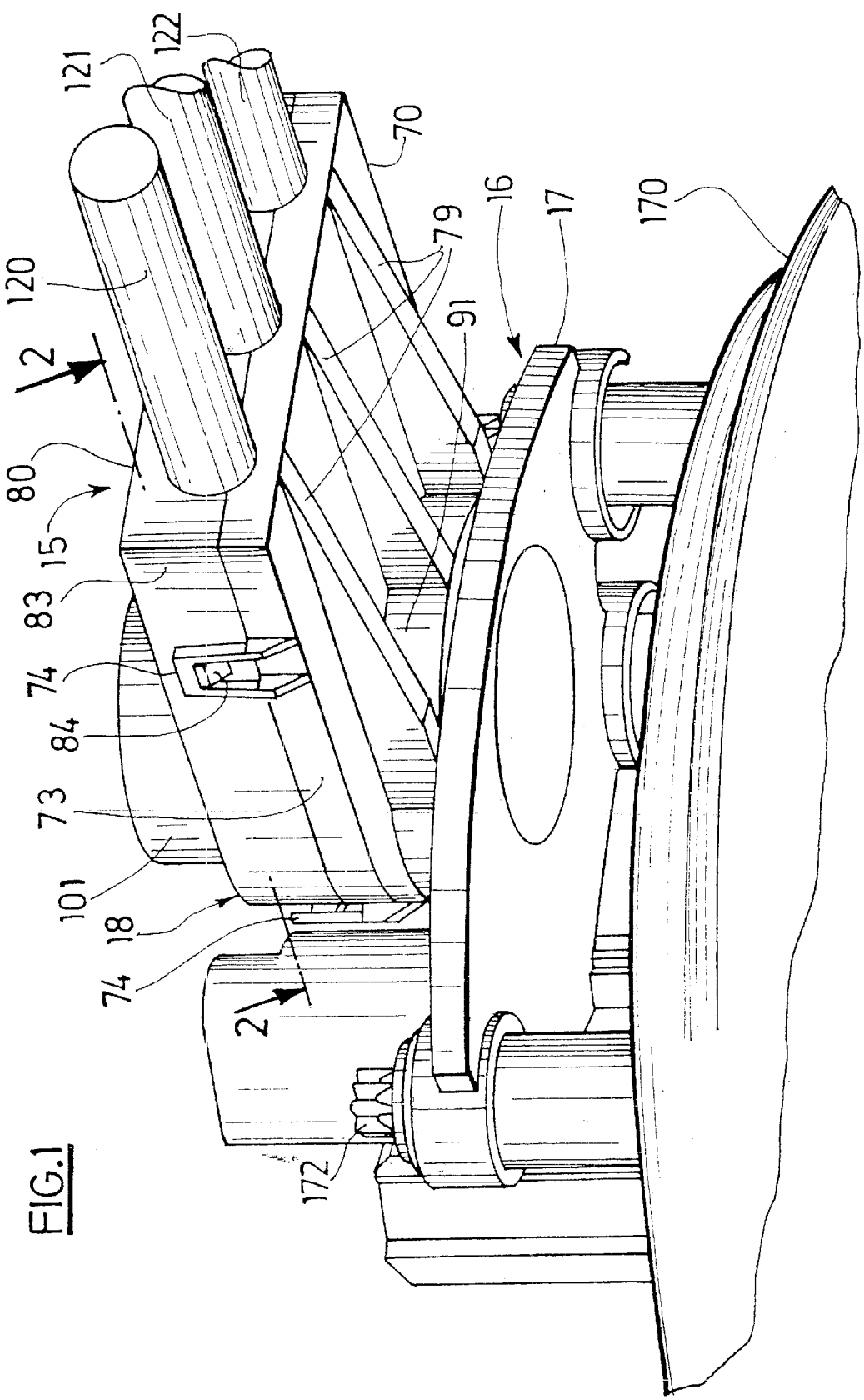
FIG. 1 is a view in perspective of the connector according to the invention mounted on the rear bearing of a multiphase and reversible rotating electric machine constituting an alternator/starter.
Figure 2:
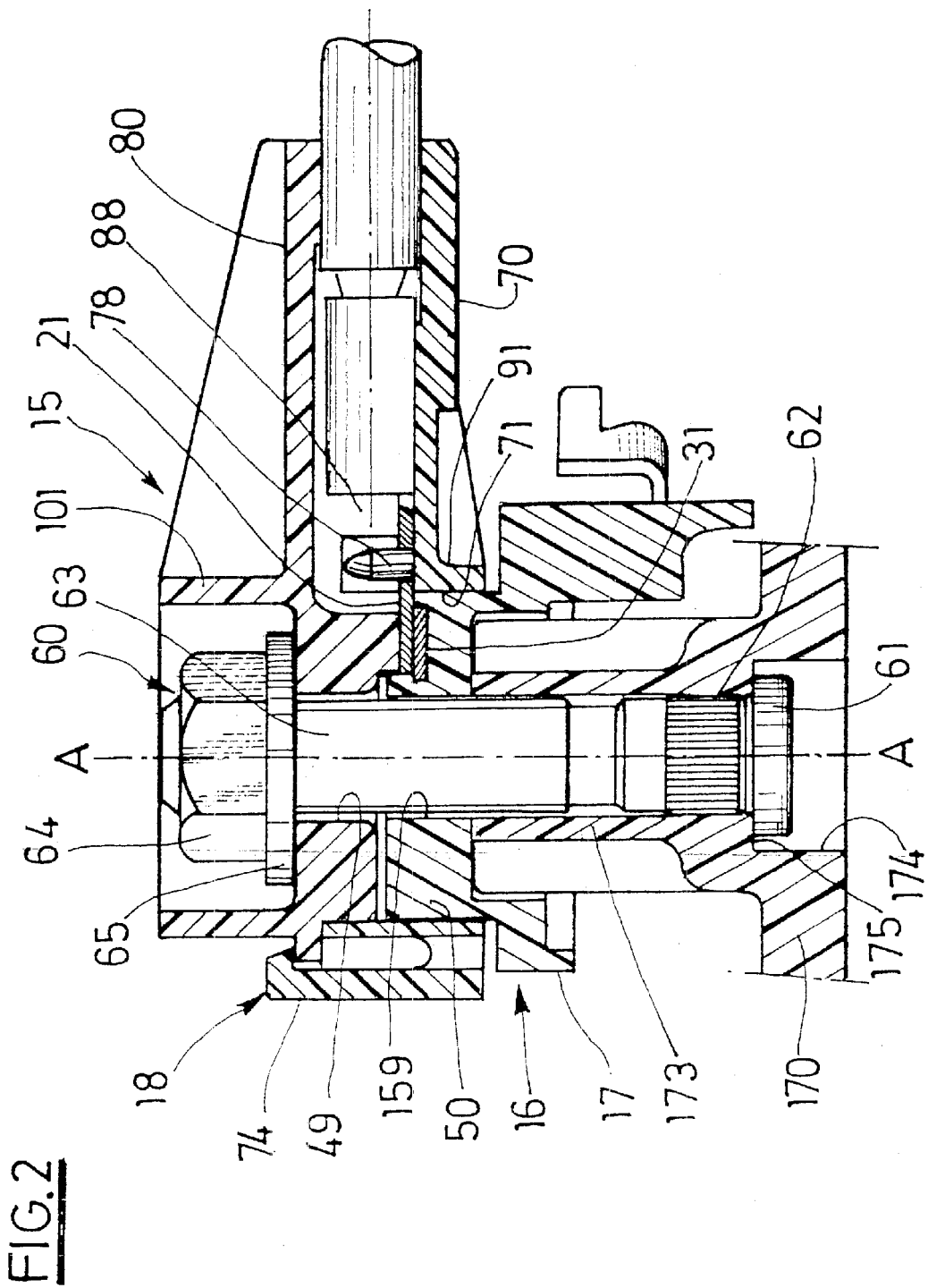
FIG. 2 is a partial view in axial section, along the line 2—2 of FIG. 1, of the connector showing the assembling means which the connector includes.
Figure 3:
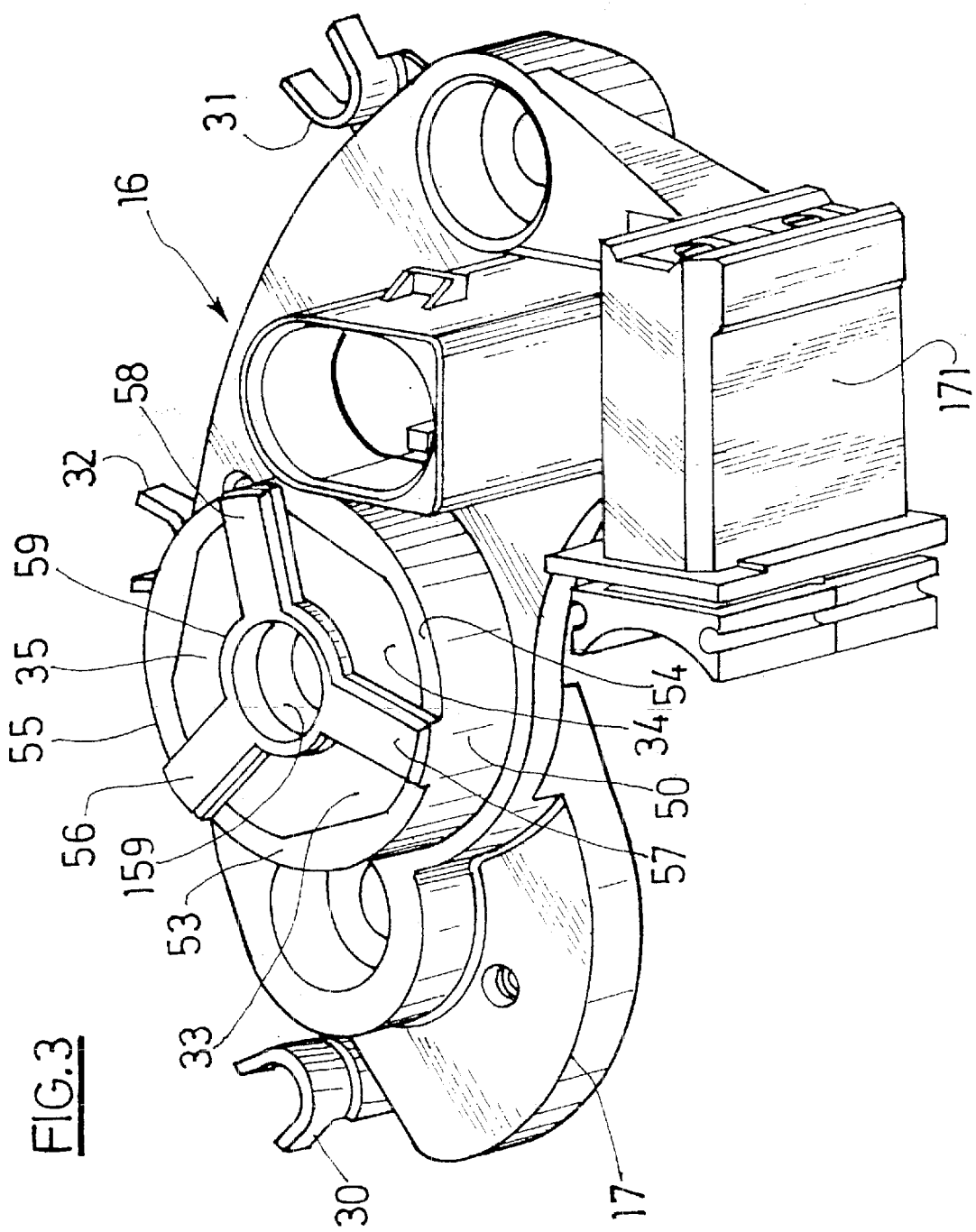
FIG. 3 is a view in perspective of the second subassembly which the connector includes.

In the description, an orientation from front to rear and upper and lower will be used; this corresponds to the orientation from left to right and top and bottom in accordance with FIGS. 1 and 2.

A connector according to the invention has been represented in the figures, consisting of a first, upper subassembly 15 linked to electrical cables 120, 121, 122, and of a second, lower subassembly 16 linked to the armature of a rotating electric machine, for example to the stator of a motor-vehicle alternator, which, in a variant, may be reversible and operate in electric-motor mode in order to start the motor vehicle. Such an alternator is called alternator/starter.

Here, the connector is mounted on the rear bearing 170 of an alternator/starter, as described in the document FR-00 03131 filed on Mar. 10, 2000 and published under number FR-A-2 806 223 to which reference should be made for further details.

This rear bearing 170 carries, fixedly, a brush holder 171, the brushes of which have not been represented here, these brushes being intended to come into electrical contact with collector rings integral with a shaft carrying the rotor, constituting the inductor of the rotating electrical machine in this multi-phase case.

In order to do that, the collector rings are linked to the ends of an excitation coil carried by the rotor, usually of the Lundell claw type. In a variant, the rotor is a salient-pole rotor as described in the document PCT/FR/02/00037.

The rear end of the shaft of the rotor is carried by the rear bearing, featuring a ball bearing centrally for this purpose.

The rotor is surrounded by the stator of the machine constituting the armature thereof, being carried partly by the rear bearing 170. The stator, in a known way, includes a body in the form of a packet of metal plates with notches for fitting electrically conducting windings belonging to the phases which the machine includes. The windings are of the type with wires or, in a variant, of the type with bars as described in the document FR 0104770 filed on May 4, 2001. The phase outputs are each linked, here by crimping, in a variant by welding, to one of the ends of second electrically conducting elements 30, 31, 32, which the second subassembly 16 of the connector according to the invention includes. In this embodiment, three elements 30, 31, 32 are provided and the electric machine is of the three-phase type.

The above-mentioned ends of the elements 30 to 32 consist of bared crimping lugs as in the document FR-A-2 754 650.

These electrically conducting elements 30, 31, 32 consist of electrically conducting strips, here made of metal, embedded in an electrically insulating piece 17 forming a support fixed by screws 172 onto the rear bearing 170 of the machine. The screws 172 have their heads bearing on the support, and each pass through a column (not referenced in the figures) so as each to be screwed into the threading of the rear bearing 170. The columns, forming spacers, are of a single piece with the support 17, being moulded integrally with them, and are therefore electrically insulating.

The electrically conducting elements 30, 31, 32 feature, at their other end, second bearing surfaces 33, 34, 35, not covered over and each in contact, here directly, in a variant indirectly via an intermediate layer, with a reaction area 53, 54, 55 belonging to the support 17. These bearing surfaces 32 to 35 are in the form of annular areas and are mounted on the upper face of a protuberance 50 of the support 17 here carrying the brush holder 171 in such a way that the conducting elements 30 to 32 feature raised areas in the region of the second bearing surfaces 32 to 35.

The support 17 is made of mouldable plastic and the brush holder 171 is moulded integrally with the support 17.

The connector according to the invention belongs to a connecting device acting between the rear bearing and a system for control of the phases of the armature of the machine which is mounted in an electronics box.

This connecting device comprises another connector mounted on this electronics box, and the electrical cables 121, 122, 123 link the two connectors to each other.

Each cable consists of electrically conducting wires each equipped with an electrically insulating sheath, which are surrounded by a common sheath with a metal braid present, if required, for electromagnetic screening of the electrical cable.

According to the invention, the connector for forming an electrical connection between, on the one hand, a first subassembly 15 comprising at least two first electrically conducting elements 20, 21, 22 each comprising a first bearing surface 23, 24, 25 and, on the other hand, a second subassembly 16 comprising at least two second electrically conducting elements 30, 31, 32 each comprising a second bearing surface 33, 34, 35, in which the first bearing surfaces 23, 24, 25 are intended to come into electrical contact with the second bearing surfaces 33, 34, 35 via one of their face [sic] and into abutment with a pressure area 43, 44, 45 belonging to the first subassembly 15 via their other face, while the other face of the second bearing surfaces 33, 34, 35 is intended to come into abutment with a reaction area 53, 54, 55 belonging to a support 17 which the second subassembly 16 includes for fixing the second elements 30, 31, 32, and in which assembling means 60 act between the pressure area 43, 44, 45 and the reaction area 53, 54, 55 so as to clamp between them the first and the second bearing surfaces 33, 34, 35–43, 44, 45 and to exert a contact pressure on the said bearing surfaces, is characterised in that the first subassembly 15 includes a casing 18 for positioning and flexible mounting of the first elements 20, 21, 22, and in that the casing 18, on the one hand, carries the pressure area 43, 44, 45 and, on the other hand, opposite the pressure area 43, 44, 45, includes an orifice 71 for allowing movement of the first bearing surfaces 23, 24, 25.

In the figures, the casing 18 is delimited, on the one hand, by a box 70 for positioning of the first elements 20, 21, 22 and, on the other hand, by a pressure cover 80 comprising the pressure area 43, 44, 45. This box 70, opposite the pressure area 43, 44, 45, includes an orifice 71 for allowing movement of the first bearing surfaces 23, 24, 25.

The first electrically conducting elements therefore feature, at their free end, flexible and therefore bendable bearing surfaces.

The number of conducting elements depends on the applications. Two or four, or even six, conducting elements may be provided.

Here, three first and second conducting elements are provided, which forms a good compromise between good contact surface areas for the conducting elements, a good distribution of the pressures and the passing of high electrical current strengths.

The pressure and reaction areas are here subdivided into three parts respectively by three slots 46 to 48 and three insulating partitions 56 to 58 described below.

The cover 80, the box 70 and the support 17 are made of mouldable and electrically insulating material, here of plastic, such that they can have the desired shape with numerous functions.

Advantageously, ribs 79, 89 are provided to reinforce these pieces 70, 80.

In a variant, these plastics are reinforced by fibres.

The pressure area 43, 44, 45 is made of creep-resistant electrically insulating material in order to make the first conducting elements 20 to 22 bend correctly.

The cover 80 is made of creep-resistant electrically insulating material.

The reaction area 53, 54, 55 is made of creep-resistant electrically insulating material in order to take up the clamping forces successfully.

The reaction area 53, 54, 55 and the cover 80 are made of thermosetting plastic for correct clamping of electrically conducting elements together.

The material of the reaction area, in one embodiment, has a greater creep resistance than the material of the rest of the support 17 such that the second subassembly 16 is economical and allows correct overmoulding of the support 17 around second electrically conducting elements 30 to 32 via an appropriate choice of the material of the rest of the support.

In a variant, the support 17 is made of a single material and reinforcing inserts are provided in the region of the reaction area.

The box 70 is made of a material, here of plastic, which is less creep-resistant than that of the cover 80 and is therefore economical.

The reaction area 53, 54, 55 consists here of an above-mentioned protuberance 50 suitable for penetrating into the orifice 71 of the box 70, which thus does not undergo any clamping forces. The protuberance 50 features a central aperture 159 for assembling means 60 to pass through.

The reaction area features, in axial projection with respect to the axis of assembly A—A of FIG. 2, insulating partitions 56, 57, 58 for separating the second bearing surfaces 33, 34, 35 from one another, here circumferentially.

The insulating partitions extend radially from the outer periphery of the reaction area 53, 54, 55 as far as a central ring 159 which the said reaction area features, in axial projection.

The central aperture of the ring 59 extends the central aperture 159 of the protuberance.

The central ring 59 and the protuberance 50 are therefore suitable for being traversed centrally by the assembling means 60.

The reaction area 53, 54, 55 is therefore hollow internally, that is to say centrally, for the assembling means to pass through.

The outer periphery of the protuberance 50 carrying the reaction area 53, 54, 55 is of cylindrical shape here for penetrating, with fitting clearance, into the orifice 71 here in the shape of a circular hole.

The pressure area 43, 44, 45 consists of an axial protuberance arising from the cover 80 and turned towards the orifice 71.

The pressure area 43, 44, 45 is separated into annular sectors 43, 44, 45 by slots 46, 47, 48 of radial orientation.

The width of the slots 46, 47, 48 is suited to the thickness of the partitions 56, 57, 58 for insulation of the reaction area so that they can penetrate into the slots 46, 47, 48.

Hence the angular position of the first subassembly 15 with respect to the second subassembly is formed in a simple and economical way. By making the position of the partitions and of the slots asymmetric, an indexing device is easily formed. The reaction area is therefore of the male type so as to penetrate via its partitions into the slots of the pressure area of the female type.

The sectors 43, 44, 45 are recessed centrally, in order for the central ring 59 of the reaction area 53, 54, 55 to penetrate.

The pressure area 44, 43, 45 centrally features an aperture 49 intended to be aligned with the aperture 159 and that of the central ring 59 of the reaction area 53, 54, 55 for the assembling means 60 to pass through.

The outer periphery of the pressure area 43, 44, 45 is of tubular shape.

Figure 5:
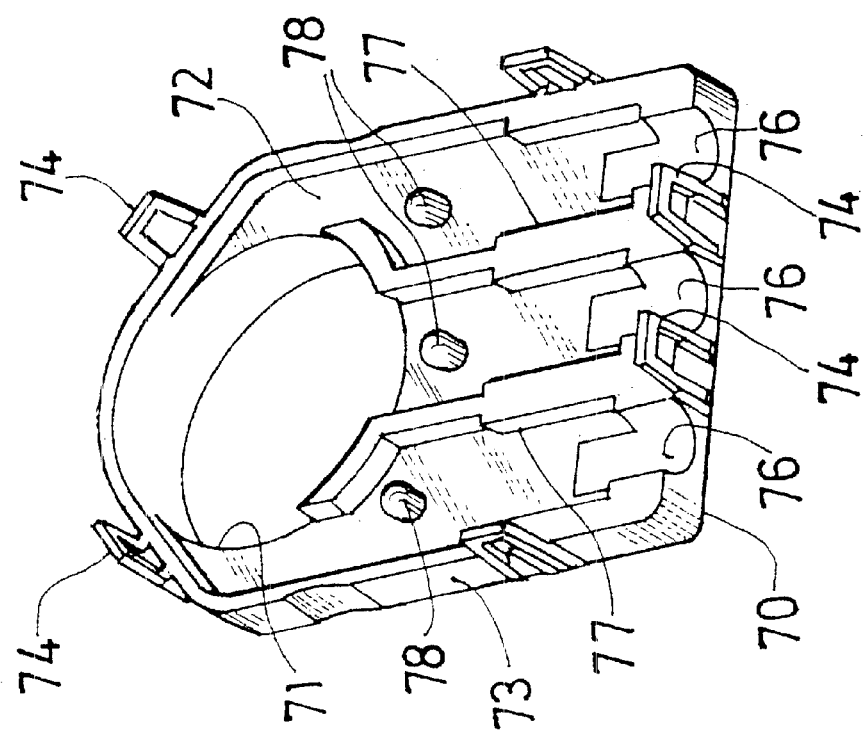
FIG. 5 is a view in perspective of the positioning box which the first subassembly of the connector includes.
Figure 4:
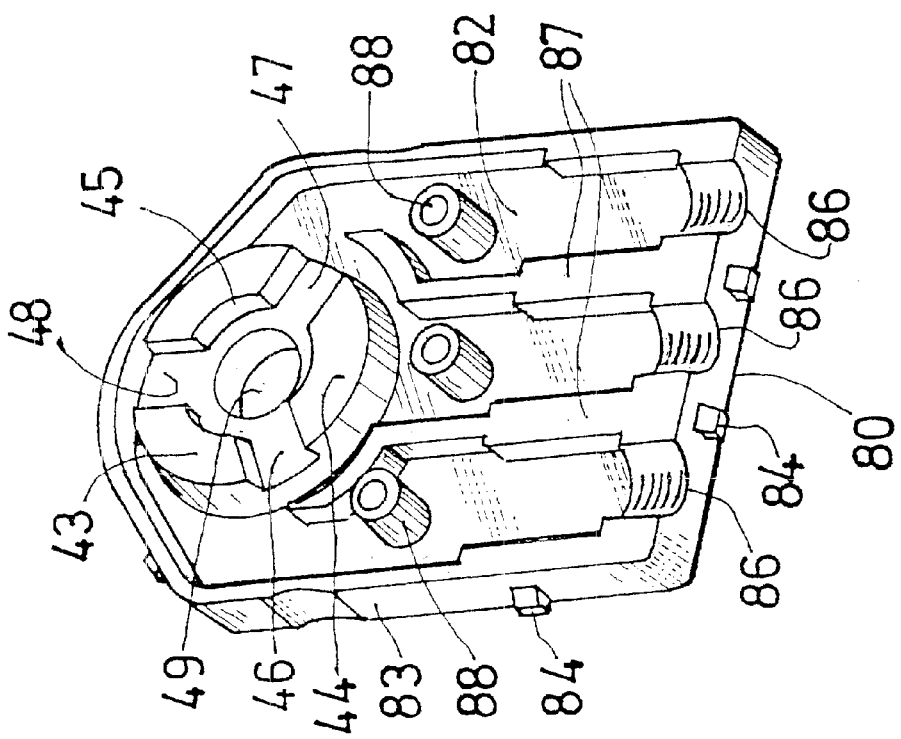
FIG. 4 is a view in perspective of the pressure cover belonging to a first subassembly which the connector includes.

Here, the front parts of the cover 80 and of the box 70 have a rounded shape as can be seen better in FIGS. 4 and 5. The pressure area and the orifice 71 respectively belong to this front part.

The cover 80 and the box 70 are of hollow shape and are overall in the shape the shape [sic] of a boat rounded at the front.

As is known, the passing of a current in an electrical conductor causes heating of the conducting material, by Joule effect, which is proportional to the product of the resistance of the conducting material and of the square of the strength of the current. It is therefore necessary for the cross-section of the first conducting elements 20 to 22 to be greater than the minimum cross-section for which the temperature of these elements 20 to 22 reaches a temperature which might risk setting fire to the connector. The same goes for the second conducting elements.

Each first conducting element makes it possible to link one electrical phase of the second, lower subassembly 16 electrically to an electrical wire of the electrical cable 120 to 122 in question.

In its rear part, the pressure cover 80 features means for fixing the electrical cables 120 to 122.

The free rear end of the cover 80, visible in section in FIG. 4, includes parts 86 for retaining the cables, each of generally semi-circular shape. The inner diameter of the retaining part 86 corresponds substantially to the outer diameter of the electrical cable 120 to 122 in question.

Projections (not referenced) are arranged on the inner surface of each retaining part 86. The projections are arranged into three parallel rows and, when the electrical cable in question is put in place in its associated retaining part 86, make it possible to prevent any longitudinal slipping of the electrical cable with respect to the cover 80. Needless to say, the box 70 features, likewise at the rear, complementary retaining parts 76 facing the retaining parts 86 of the cover 80 so as to form circular passages for the cables 120 to 122.

The mounting of the first, upper subassembly 15 is as follows.

In the first place, it is necessary to prepare the electrical cables 120 to 122. A free end part of the sheath is removed, so as to leave the electrical wires free over a given length. The free length of each electrical wire is adjusted so as to be able to carry out the subsequent fitting into the box 70. The bared ends of the cables are fixed by terminations 123 to 125 to the first conducting elements. The terminations belong to the first conducting elements in the way described below.

Next, the cables fitted with the conducting elements are mounted into the box 70 equipped with positioning means 78 and with separating partitions 77 for the conducting elements 20 to 22 in the way described below.

Finally, the box is closed by the use of the cover 80 equipped with means 88 for preventing the conducting elements 20 to 22 rising up in the way described below, so as to obtain a first easily handled subassembly 15, transportable and loss-proof.

Advantageously, a heat-shrinkable sheath is arranged in the retaining parts 86, 76 of the first, upper subassembly 15, as well as around each electrical cable 120 to 122 leaving the first subassembly 15. After heating, the heat-shrinkable sheath ensures good leaktightness between the electrical cables and the first subassembly 15.

The second, lower subassembly 16, which is intended to be coupled with the first, upper subassembly 15, is fixed onto the rotating machine in the above-mentioned way.

The electrically insulating support 17 is arranged in the region of its protuberance 50 around the assembling axis A—A of FIG. 2, which, here, is of radial orientation with respect to the rotational axis of the rotating machine.

The three second conducting contact elements 30 to 32 are insulated electrically from one another via the moulded insulating material of the support 17. They each have an active, bared, upper horizontal contact surface, namely their second bearing surface 33 to 35, which comes flush with the support. The active surfaces here are the counterpart of the contact bearing surfaces 23 to 25 of the first conducting elements 20 to 22.

In the figures, the assembling means 60 include a single screw 63 integral with the second subassembly 16, and a nut 54 bearing on the upper face of the cover 80 via a washer 65. This face belongs to a bottom 72 which the cover 80 features. The screw 63 passes axially through the aperture 49 of the pressure area as well as the central ring 59 of the reaction area. The axis of axial symmetry of the screw 63 constitutes the assembling axis A—A.

The head 61 of the screw 63 is integral, here indirectly, in a variant directly, with the support 17.

Hence it is possible to thread the first subassembly 15 with its casing 18 onto the screw 63 and ensure fixing by the use of the nut 64 screwing onto the threaded free end of the screw 63.

Other assembling means, such as a clipped fixing by elastic recessing, may replace the assembling screw 63.

In a variant, the assembling means consist of a rivet replacing the screw 63. In this case, the connector cannot be dismantled. The solution with a nut and bolt is preferable, since it is possible to have better control of the clamping.

The arrangement according to the invention features the advantage of not being sensitive to vibration, by virtue of the flexible mounting of the first conducting elements.

Moreover, the connector is identical, whether the coupling of the phases of the rotating machine is in star or delta mode, which makes it possible to standardise the moulds for manufacturing the box 70 and the cover 80.

The geometric compactness of the connector will be appreciated, making it possible to minimise the length of the phase outlets of the armature belonging, in the case of an alternator or of an alternator/starter, to the stator of the rotating machine.

The presence of a single assembling means 60, between the casing 18 and the support 17, will be appreciated.

This assembling means, electrically conducting here, allows a uniform distribution of pressure in combination with the orifice 71 and the pressure area 43 to 45.

Advantageously, the screw 63 is knurled at 62 in the region of its lower head 61 such that the screw can be inserted by force by its knurling into an insert embedded in the protuberance 50 and thus be kept captive. This insert is preferably linked to earth. In this case, the assembling means are integral with the support 17.

In a variant, the insert is replaced by a columnar boss 173 moulded integrally with the bearing 170, conventionally aluminium-based, and serving, at its free end, as guide for the lower face of the protuberance 50, as can be seen in FIG. 2.

The lower head 61 of the screw 63 bears on a shoulder 175 formed thanks to a countersinking 174 created in the region where the column 173 is rooted to the bearing 170. The screw 63 passes through the column 173 with its body, as well as the reaction and pressure areas, and a support washer 65, such as a Grower washer or a Belleville washer. The washer 65 is in abutment on the upper face of the cover opposite the pressure area.

The assembling nut 64 is screwed onto the free end of the screw in contact with the support washer and presses this support washer into contact with the upper face of the cover 80. Needless to say, the screw 63 features a knurling 62 in the vicinity of its head 61 for anchoring it into the column, which locally internally features a local reduction in diameter for this purpose in the vicinity of the shoulder 175 as can be seen in FIG. 2. The screw 63 is thus held captive.

In a variant, the nut can be fixed onto the upper face of the cover and the screw head bears directly or indirectly on the support 17 so as to be screwed onto the nut. In a variant, the structures are reversed, the screw 63 being integral with the cover 80 and bearing, via its head 61, onto the upper face of the cover 80, being force-fitted by its knurling 62 into the aperture 49. The nut is then screwed from below, bearing via its washer 65 on the shoulder 175.

In all cases, the electrically conducting assembling means 60 include a shouldered part such as a head or a nut, bearing directly or indirectly on the cover 80 and a body passing axially through the pressure and reaction areas and therefore the first conducting elements. The axial axis of symmetry of these assembling means 60 constitutes the assembling axis, A—A of FIG. 2.

In the figures, the box 70 and the cover 80 of the casing 18 extend transversally with respect to the assembling axis A—A, of FIG. 2, being a hollow shape.

They each feature a bottom 82, 72 respectively, delimited by a peripheral rim 83, 73 respectively, perpendicular to the bottom 82, 73.

The upper face of the rim 73 of the box 70 is intended to come into contact with the lower face of the rim 83 of the cover 80, such that, after these two pieces have been assembled, the casing 18 is leaktight. If required, a gasket can be bonded onto one of the rims 73, 83 in order to improve the leaktightness.

The cover 80 is assembled to the box 70 by clipping, so that it can be dismantled. In order to do this, the cover 80 features projections 84, along its rim 83, while the box 70 features, along its rim 73, complementary projections 74 extending perpendicularly to the projections 84. The projections 74, 84 are six in number here for each group of projections. Reference may be made to FIGS. 4 and 5 for their distribution.

The projections 74 arising from the rim 73 of the box 70 are U-shaped lugs higher than the rim 73 in order for each to delimit a recess for accommodating the associated solid projection 84 of the cover 80. The projections 84 each feature an inclined flat intended to co-operate with the bottom of the U of the lugs 74 and to space them apart during the assembling of the cover 80 with the box 70. Next the lugs 74 close over as soon as the bottom of the U of the lugs 74 is crossed. Needless to say, the structures can be reversed, the lugs then arising from the rim 83 and the solid projections from the rim 73. The hollowed lugs 74 are, in any event, intended to come into engagement by clipping with the projections 84.

In a variant, the assembling of the cover 80 and the box 70 is achieved by the use of screws or bolts acting in the region of the rims 73, 83.

In a variant, the assembling of the cover 80 with the box 70 is carried out such that it cannot be dismantled, for example by the use of rivets or of bonding or of welding, such as welding of the laser type or of ultrasonic welding, in the region of the rims 73, 83.

The upper face of the bottom 72 of the box features two separating partitions 77, and the same is true of the lower face of the bottom 82 of the cover 80, featuring two separating partitions 87.

The partitions 77, 87 have the same shape and each have a front part in circular-sector shape delimiting the orifice 71, here circular and of large size. The rear part of the partitions 77, 87 is connected to the rear part of the rim 73, 83 respectively of the box 70 and of the cover 80, each in the respective extension of a lug 74 in the case of the partitions 77 and of a solid projection 84 in the case of the partitions 87.

The rear part of the partitions 77, 87 is wider than their front part and their intermediate part for connecting from the front part to the rear part.

The intermediate part of the partitions 77, 87 has the same width as the front part and extends longitudinally just like the rear part which it prolongs.

The front part of the partitions 77 serves to separate the first bearing surfaces 23 to 25 and to insulate them from one another. The first bearing surfaces are in the shape of annular sectors here, as can be seen better in FIG. 6. The sectors are separated by slots for the partitions of the reaction area to pass.

The partitions 77, 87 have a corresponding shape. A clearance exists between the pressure area 43 to 45 and the front parts, on the one hand, of the partitions 87 and, on the other hand, of the rim 83. The front part of the rim 73 delimits the orifice or aperture 71.

The retaining parts 76, 86 act on the rear part of the rim 73, 83.

The rims 73, 83 have a rear part perpendicular to two longitudinal parts for connecting to a rounded front part, such that they have a rectangular shape in which one of the widths might have been replaced by a round part constituting the front part. It is therefore the same as the box 70 and the cover 80. The parts 76, 86 for retaining the cables 120 to 122 constitute jaws for the said cables and act on the rear part of the rims 73, 83.

The partitions 77, 87 and the longitudinal parts delimit the retaining parts 76, 86 as can be seen in FIGS. 4 and 5.

As FIGS. 4 and 5 bring to light, the rims 73, 83 and the partitions 77, 87 delimit three housings for the electrically insulated mounting of the three first conducting elements 20 to 22, the front parts of which, in annular-sector shape, define the three first bearing surfaces 23 to 25 extending into the orifice 71, here in the shape of a circular hole. The bearing surfaces 23 to 25 constitute the free ends of the conducting elements 20 to 22.

The rear part of each first conducting element 20 to 22 features edges laterally, in such a way that, after folding-down of the two edges, the rear part of each first conducting element 20 to 22 constitutes a termination 123 to 125 coming to clamp and fix the bared ends of electrical wires of the cables 120 to 122, so as to provide an electrical contact.

It is for this reason that the rear parts of the partitions 77 are wider so as to immobilise the terminations 123 to 125 correctly.

Needless to say, the number of electrical wires of the cables 120 to 122 depends on the applications.

The terminations 123 to 125 are each terminations for fitting to an electrical cable.

The annular sectors constituting the first bearing surfaces 23 to 25 are here of the same extent and allow a high electrical-current strength to pass without the box 70 and the cover 80 risking being damaged or catching fire, such that the configuration with three conducting elements 20 to 22 is advantageous since, for equal bulk, it allows a heavier current to pass than with an arrangement, for example, with four conducting elements, while ensuring a pressure which is better balanced than with two or four conducting elements after the connector has been fixed by the assembling means 60.

The first conducting elements 20 to 22 consist of flat strips of metal obtained by cutting-out from an electrically conducting metal plate. These strips are in the form of flexible tongues.

Each first conducting element 20 to 22 features an intermediate part connecting its front part with its rear part in the form of a termination. The intermediate parts are intended to bear against the bottom 72 of the box 70.

Each intermediate part includes a hole (not referenced) into which penetrates a pip of material 78 moulded integrally with the bottom 72 of the box 70.

The three pips 78, at the rate of one pip per housing of a cable, are in the shape of pins with a penetrating-shaped extremity, here in ogive shape, for passing through three of the conducting elements 20 to 22.

Thus are constituted means for positioning the first conducting elements 20 to 22 before the box 70 is closed by the cover 80 as can be seen in FIG. 6, such that the box 70, with its separating partitions 77, and its rim 73, constitutes a box for positioning the first electrically conducting elements 20 to 22.

The cover 80 features three projecting sockets 88 arising by moulding from the lower face of its bottom 82. The sockets 88 are intended each to serve as a receptacle for a pip 78 and to come into abutment on the first conducting element 20 to 25 in question, as can be seen in FIG. 2. The pips 78 here penetrate, with clearance, into the sockets 88 closed by the bottom 82.

By virtue of this arrangement, each first bearing surface 23 to 25 can bend like a beam since it can penetrate into the orifice 71 and since the intermediate part of each first conducting element 20 to 22 is sandwiched between the bottom 72 of the box 70 and the sockets 88 constituting a sort of anti-lifting means for the first conducting elements 20 to 22.

Needless to say, the anti-lifting means 88 of the cover 80 and the positioning means 78 of the box 70 may have another shape. For example, the first conducting elements 20 to 22 may laterally feature, in the case of at least one of them, a notch into which a projection arising from the box 70 penetrates. The positioning means then consist of two lateral projections, while the anti-raising means may then consist of a solid projection arising from the cover 80 and extending between the lateral projections of the box 70. In both cases, the anti-raising means consist of an end stop arising from the cover 80. All the shapes of the box and of the cover are easily obtained by moulding due to the fact that the latter are made of mouldable plastic.

Advantage is then taken of this to equip the lower and upper faces of the bottoms 72, 82 respectively with stiffening rib [sic] 79, 89, having a height decreasing rearwards.

At least some of the ribs 79, 89 are connected to an axially oriented annular skirt 91, 101 along the assembling axis A—A. These skirts have a cylindrical shape.

The upper skirt 101 of the cover 80 delimits a cavity for accommodating one of the ends of the assembling means, here the nut 64 and its washer 65. This cavity is open outwards and features a bottom complete with an aperture intended to be traversed, in the above-mentioned way, by the screws 63 of the assembling means 60. The bottom of the cavity belongs to the bottom 82 and therefore to the upper face of the cover 80.

The skirt 91 of the box has an internal diameter equal to that of the orifice 71, circular here.

The skirt 91 therefore extends the orifice 71 internally axially downwards.

This skirt 91 serves as a receptacle for the reaction area 53 to 55 and thus for the hollow protuberance 50 carrying the bearing surfaces 33 to 35 in the region of its upper face.

The outer diameter of the peripheral skirt of the protuberance 50 is equal, to within the fitting clearance, to the inner diameter of the skirt 91 such that the mounting is leaktight.

The first subassembly is of slight thickness and is easily housed, here to the rear of the rotating electric machine, given that the control system is not fitted at this site.

The first subassembly 15 occupies the radial space available at this site.

The simplicity of the first conducting elements 20 to 22 will be appreciated, as well as their low cost and their reliable electrical link with the cables by virtue of the terminations 123 to 125.

Advantage is taken of the flat shape, except to the rear, of the first conducting elements in strip form in order to make these conducting elements bend at the front so that they come into contact with the second bearing surfaces.

Needless to say, the invention is not limited to the embodiment examples represented.

Thus the cover 80 can be of two materials and include a lower part made of an electrically insulating material, overmoulded onto a metal upper part.

The box may be of two materials and include an upper part made of an electrically insulating material overmoulded onto a metal lower part. The pressure area, with or without the skirt 101, is, in a variant, affixed onto the rest of the cover 80, for example by overmoulding, bonding, clipping (clicking in) or welding, for example of the ultrasonic or laser type, onto the rest of the cover, which, in all cases, carries the pressure area. Here the box and cover are not reinforced by fibres for reasons of economy, in a variant it is possible to provide reinforcing fibres. In a variant, the casing 18, with the skirt 91 and the orifice 71 is produced by overmoulding onto the first electrically conducting elements, the first bearing surfaces of which are visible in the region of the orifice 71. In this case, the pressure area is affixed in the above-mentioned way (overmoulding, clipping, bonding, welding, etc) onto the casing. The casing, in all cases, carries the pressure area.

Needless to say, the cover may include a creep-resistant pressure area, with the rest made of a material less resistant to creep and reinforced by fibres. This pressure area, in one variant, is equipped at its free end with a layer or more generally with a coating, for example of greater hardness. The pressure area here has an outer diameter at most equal to that of the orifice 71 so that the bearing surfaces 23 to 25 can penetrate into the orifice 71. Its outer diameter is equal here to the outer diameter of the protuberance 50; in a variant it is less than that of the protuberance.

The intermediate part of the partitions 77, 87 can be dispensed with, given that the rear part of them retains the terminations 123 to 125.

Needless to say, the height of the partitions 77, 87, of the pips 78 and the sockets 88, all perpendicular to the bottoms 72, 82, is such that the rims 73, 83 can come into contact with one another.

The skirt 91 makes it possible to guide the protuberance 50 and hence the reaction area. Upon assembly, by the use of the means 60, the bearing surfaces 23 to 25 are pressed by the pressure area (and thus by the protuberance of the cover constituting it) and bend, engaging in the orifice 71 extended by the cylindrical-shaped skirt 91.

After assembling, the bearing surfaces 23 to 25 are under stress, and match the shape of the second bearing surfaces 33 to 35. This makes it possible to take up the defects in flatness and the manufacturing tolerances.

A bending movement of the bearing surfaces 23 to 25 therefore takes place during the assembling of the two subassemblies 15–16. It will be appreciated that the box 70 is not subjected to the forces generated by the assembling means.

In a variant, the pressure and reaction areas can be cylindrical, with square or rectangular cross-section, such that the orifice may be of square or rectangular cross-section. Polygonal cross-sections which can likewise be envisaged for the orifice and the pressure and reaction areas. In all cases, the pressure and reaction areas (and thus the protuberance) have a size, in cross-section, less than or equal to that of the orifice 71.

The second subassembly 16 with its support 17 is well suited for being mounted in an alternator/starter of the type described in the document FR-A-2 806 224. For further details, reference can be made to FIG. 8 of this document showing the second subassembly with its support mounted on the rear bearing, as well as a sensor holder featuring lugs with oblong apertures for fixing it, with angular adjustment, onto the rear bearing. This rear bearing features apertures for detecting, via the sensors, magnetic targets integral with a target holder implanted between the rotor the rear bearing.

This rear bearing is integral with a front bearing, for example by the use of screws or of tie rods, carrying, centrally, thanks to a ball bearing, the front end of the shaft of the rotor on which a pulley is fixed, linked by a transmission device, including at least one belt, to a drive shaft of the internal-combustion engine of the motor vehicle.

The bearings are pierced for cooling air to circulate, which are [sic] generated by the rotation of internal fans carried by the ends of the rotor. The bearings have a hollow shape and, thanks to ball bearings, centrally carry the shaft carrying the rotor and, at their outer periphery, the body of the stator. These bearings, advantageously made of aluminium, provide an earth return and feature lugs for fixing and adjustment on a fixed part of the motor vehicle. In a variant, the alternator/starter is cooled by water, such that the bearings are equipped with chambers for a cooling liquid to circulate, usually the cooling water from the engine of the vehicle.

The second subassembly is then integral with a support which also carries the brush holder.

The connector according to the invention then belongs to a device for connecting between the machine and an electronics box including an electronic control and monitoring module also equipped with a control and management unit.

The machine is then reversible and can work in electric-motor mode for starter [sic] the vehicle, and in alternator mode for recharging the battery of the vehicle and supplying the consuming units of the vehicle.

For further details, reference may be made to the above-mentioned document.

The connector according to the invention is well suited to a rotating electric machine operating at a voltage of 42 V.

What is claimed is:

1. Connector for forming an electrical connection between, a first subassembly (15) comprising at least two first electrically conducting elements (20, 21, 22) each comprising a first bearing surface (23, 24, 25) and a second subassembly (16) comprising at least two second electrically conducting elements (30, 31, 32) each comprising a second bearing surface (33, 34, 35), wherein the first bearing surfaces (23, 24, 25) are adapted to come into electrical contact with the second bearing surfaces (33, 34, 35) via a face and into abutment with a pressure area (43, 44, 45) belonging to the first subassembly (15) via another face, while the other face of the second bearing surfaces (33, 34, 35) is intended to come into abutment with a reaction area (53, 54, 55) belonging to a support (17) which the second subassembly (16) includes for fixing the second elements (30, 31, 32), and in which assembling means (60) act between the pressure area (43, 44, 45) and the reaction area (53, 54, 55) so as to clamp between them the first and the second bearing surfaces (23, 24, 25–33, 34, 35) and to exert a contact pressure on the bearing surfaces, wherein the first subassembly (15) includes a casing (18) for positioning and flexible mounting of the first conducting elements (20, 21, 22), and the casing carries the pressure area (43, 44, 45) and opposite the pressure area (43, 44, 45), includes an orifice (71) for allowing movement of the first bearing surfaces (23, 24, 25).

2. Connector according to claim 1, wherein the casing (18) is delimited, on the one hand, by a box (70) for positioning of the first conducting elements (20, 21, 22) and, on the other hand, by a pressure cover (80) carrying the pressure area (43, 44, 45), in that the box (70), opposite the pressure area (43, 44, 45), includes an orifice (71) for allowing movement of the first bearing surfaces (23, 24, 25) and in that fixing means (74, 84) act between the box (74) and the cover (80).

3. Connector according to claim 2, wherein the cover (80), the box (70) and the support (17) are made of a mouldable material and are electrically insulating.

4. Connector according to claim 3, wherein the box (70) is made of a material which is less creep-resistant than that of the cover (80).

5. Connector according to claim 2, wherein the box (70) includes positioning means (78) for the first conducting elements (20 to 22) and in that the cover (80) features means (88) for preventing the first electrically conducting elements (20 to 22) rising up.

6. Connector according to claim 5, wherein the box (70) features a bottom (72) equipped with at least two pips (78) constituting the positioning means and each suitable for penetrating into an aperture of a first electrically conducting element for positioning it and in that the cover features a bottom (82) equipped with projecting sockets (88) for penetration into each of them by a pip (78) and creating a means preventing the first electrically conducting elements (20 to 22) rising up.

7. Connector according to claim 2, wherein the box (70) features separating partitions (77) for the first electrically conducting elements (20 to 22).

8. Connector according to claim 2, wherein the cover (80) and the box (70) have a hollow shape and each feature a bottom (72, 82) delimited by a peripheral rim (73, 83) perpendicular to the bottom and in that the fixing means include hollowed projecting lugs (74) arising from one of the rims of the cover (80) and of the box (70) and intended to come into engagement, by clipping, with projections (84) arising from the other rim of the box (70) and of the cover (80).

9. Connector according to claim 8, wherein the rims (73, 83) feature, at the front, a rounded shape in the vicinity of the orifice (71) of the box (70) in the shape of a circular hole and, at the rear, in a complementary manner, retaining parts for electrical cables (120 to 122).

10. Connector according to claim 2, wherein the cover (80) and the box each feature stiffening ribs (89, 79) and an annular skirt (101, 91) for respectively accommodating one of the ends of the assembling means (60) and of the reaction area (53 to 55).

11. Connector according to claim 1, wherein the pressure area (43, 44, 45) and the reaction area (53, 54, 55) are made of an electrically insulating and creep-resistant material.

12. Connector according to claim 11, wherein the reaction area (53, 54, 55) includes a protuberance (50) the cross-section of which is of a size less than or equal to that of the orifice (71) of the casing (18) and in that the pressure area (43, 44, 45) includes a protuberance arising from the casing (18) and directed towards the orifice (71).

13. Connector according to claim 12, wherein the reaction area features, in projection, insulating partitions (56, 57, 58) for separating the second bearing surfaces (33, 34, 35) from one another, while the pressure area (43, 44, 45) is separated into sectors (43, 44, 45) by slots (46, 47, 48) of radial orientation, and in that the width of the slots (46, 47, 48) is suited to the thickness of the insulating partitions (56, 57, 58) so that they can penetrate into the slots (46, 47, 48).

14. Connector according to claim 12, wherein the outer periphery of the reaction area (53, 54, 55) is of cylindrical shape and is suitable for penetrating into a cylindrical skirt (91) which the casing (18) features and in that the skirt (91) internally extends the orifice (71) of circular shape.

15. Connector according to claim 1, wherein the assembling means (60) include a shouldered part (61, 64) bearing on the casing (18) and a body passing axially through the pressure (43 to 45) and reaction (53 to 55) areas and the first conducting elements (20 to 22).

16. Connector according to claim 1, wherein the first conducting elements (20 to 22) extend perpendicularly to the axis of the assembling means which constitutes the assembling axis and in that the first conducting elements are in the shape of metal strips each featuring, at the front, a first bearing surface (23 to 25) and, at the rear, a termination (123 to 125) for assembling to an electrical cable (120 to 122).

17. Connector according to claim 1, wherein it includes three first and three second electrically conducting elements (20 to 22/23 to 25).

18. Multi-phase rotating electric machine, including a rear bearing (170), wherein the rear bearing (170) carries the support (17) of the second subassembly (16) of a connector according to claim 1 on which the first subassembly is mounted.

* * * * *